(12) United States Patent
Cazzolla et al.

(10) Patent No.: US 7,831,656 B2
(45) Date of Patent: Nov. 9, 2010

(54) EFFORTLESS ASSOCIATION BETWEEN SERVICES IN A COMMUNICATION SYSTEM AND METHODS THEREOF

(75) Inventors: John J. Cazzolla, Port St. Lucie, FL (US); Reza Ghasemi, Pompano Beach, FL (US); Walter Haenel, Holzgerlingen (DE); Joseph A. Hansen, Coral Springs, FL (US)

(73) Assignee: International Business Machines Corporation, Armonk, NY (US)

( * ) Notice: Subject to any disclaimer, the term of this patent is extended or adjusted under 35 U.S.C. 154(b) by 1060 days.

(21) Appl. No.: 11/025,736

(22) Filed: Dec. 29, 2004

(65) Prior Publication Data

US 2006/0143308 A1   Jun. 29, 2006

(51) Int. Cl.
   *G06F 15/16* (2006.01)
(52) U.S. Cl. .................. 709/203; 380/270; 726/21; 726/26; 370/352; 370/389; 370/401; 709/228
(58) Field of Classification Search .................. 709/203, 709/226
   See application file for complete search history.

(56) References Cited

U.S. PATENT DOCUMENTS

| | | | | |
|---|---|---|---|---|
| 5,953,392 A | * | 9/1999 | Rhie et al. ............... | 379/88.13 |
| 6,374,223 B1 | * | 4/2002 | Donaldson et al. .......... | 704/260 |
| 6,385,646 B1 | * | 5/2002 | Brown et al. ................. | 709/217 |
| 6,654,722 B1 | * | 11/2003 | Aldous et al. ............ | 704/270.1 |
| 6,711,618 B1 | * | 3/2004 | Danner et al. ................ | 709/228 |

(Continued)

OTHER PUBLICATIONS

U.S. Appl. No. 10/732,085, Cazzolla et al.

*Primary Examiner*—Hassan Phillips
*Assistant Examiner*—Saket K Daftuar
(74) *Attorney, Agent, or Firm*—Novak Druce + Quigg

(57) ABSTRACT

A communication system (100) includes a portal (110), a subscriber (108), a service processor (112), and a communication network (102-104, 107) for providing communication between the portal (110), the subscriber (108) and the service processor (112). The components (108-112) of the communication system (100) are programmed to transmit registration information from the subscriber (108) to the portal (110), transmit from the portal (110) to the subscriber (108) a coupling application (212), corresponding controllable content, and a ticket identifying a communication session between the subscriber and the portal, invoke the coupling application (212) in response to a content type of the controllable content selected at the subscriber (108), transmit the ticket and the content type from the coupling application (212) to the service processor (112), transmit the ticket and the content type from the service processor (112) to the portal (110), transmit supplementary content corresponding to the content type from the portal (110) to the service processor (112), and transmit synthesized content corresponding to the supplementary content from the service processor (112) to the subscriber (108).

9 Claims, 3 Drawing Sheets

U.S. PATENT DOCUMENTS

| | | | | |
|---|---|---|---|---|
| 6,738,803 B1* | 5/2004 | Dodrill et al. | ................ | 709/218 |
| 6,785,266 B2* | 8/2004 | Swartz | ........................ | 370/352 |
| 6,983,249 B2* | 1/2006 | Sakai | ........................ | 704/258 |
| 7,127,495 B2* | 10/2006 | Brown et al. | ................. | 709/217 |
| 7,260,260 B2* | 8/2007 | Kondo et al. | ............... | 382/173 |
| 7,305,342 B2* | 12/2007 | Shizuka et al. | .............. | 704/260 |
| 7,346,168 B2* | 3/2008 | Chou et al. | ................. | 380/270 |
| 7,382,770 B2* | 6/2008 | Bergman et al. | ............ | 370/352 |
| 2002/0055843 A1* | 5/2002 | Sakai | ........................ | 704/258 |
| 2002/0083324 A1* | 6/2002 | Hirai | ........................ | 713/176 |
| 2002/0176403 A1* | 11/2002 | Radian | ...................... | 370/352 |
| 2003/0014252 A1* | 1/2003 | Shizuka et al. | .............. | 704/258 |
| 2003/0023443 A1* | 1/2003 | Shizuka et al. | ................ | 704/260 |
| 2003/0080963 A1* | 5/2003 | Van Hook et al. | ........... | 345/501 |
| 2003/0161298 A1* | 8/2003 | Bergman et al. | ............ | 370/352 |
| 2003/0233238 A1* | 12/2003 | Creamer et al. | .......... | 704/270.1 |
| 2004/0019476 A1* | 1/2004 | Glynn | ........................... | 704/1 |
| 2004/0252679 A1* | 12/2004 | Williams et al. | ............. | 370/356 |
| 2005/0027590 A9* | 2/2005 | Gailey et al. | .................. | 705/14 |
| 2005/0027591 A9* | 2/2005 | Gailey et al. | .................. | 705/14 |
| 2005/0074104 A1* | 4/2005 | Swartz | .................. | 379/142.08 |

* cited by examiner

EFFORTLESS ASSOCIATION BETWEEN SERVICES IN A COMMUNICATION SYSTEM AND METHODS THEREOF

FIELD OF THE INVENTION

This invention relates generally to communication systems, and more particularly to an effortless association between services in a communication system and methods thereof.

BACKGROUND OF THE INVENTION

Corporate enterprises often provide their employees a portal to access productivity tools from a central location, which in turn offer information technology (IT) specialists a means for efficient management of large corporate applications (e.g., email exchange servers, databases, and like services). Portals, however, suffer from the inability to provide corporate users an effortless association between services operating on the portal and services operating on non-corporate servers.

SUMMARY OF THE INVENTION

Embodiments in accordance with the invention provide a system and method for effortless association between services in a communication system.

In a first embodiment of the present invention, in a communication system having a portal, a subscriber, and a service processor, each coupled to the other by way of a communication network of the communication system, a method comprising the steps of transmitting registration information from the subscriber to the portal, transmitting a from the portal to the subscriber a coupling application, corresponding controllable content, and a ticket identifying a communication session between the subscriber and the portal, invoking the coupling application in response to a content type of the controllable content selected at the subscriber, transmitting the registration information and the content type from the coupling application to the service processor, transmitting the registration information and the content type from the service processor to the portal, transmitting supplementary content corresponding to the content type from the portal to the service processor, and transmitting synthesized content corresponding to the supplementary content from the service processor to the subscriber.

In a second embodiment of the present invention, a communication system, having a portal, a subscriber, a service processor, and a communication network for providing communication between the portal, the subscriber and the service processor; wherein the components of the communication system are programmed to transmit registration information from the subscriber to the portal, transmit from the portal to the subscriber a coupling application, corresponding controllable content, and a ticket identifying a communication session between the subscriber and the portal, invoke the coupling application in response to a content type of the controllable content selected at the subscriber, transmit the registration information and the content type from the coupling application to the service processor, transmit the registration information and the content type from the service processor to the portal, transmit supplementary content corresponding to the content type from the portal to the service processor, and transmit synthesized content corresponding to the supplementary content from the service processor to the subscriber.

DETAILED DESCRIPTION OF THE DRAWINGS

Figure 1:
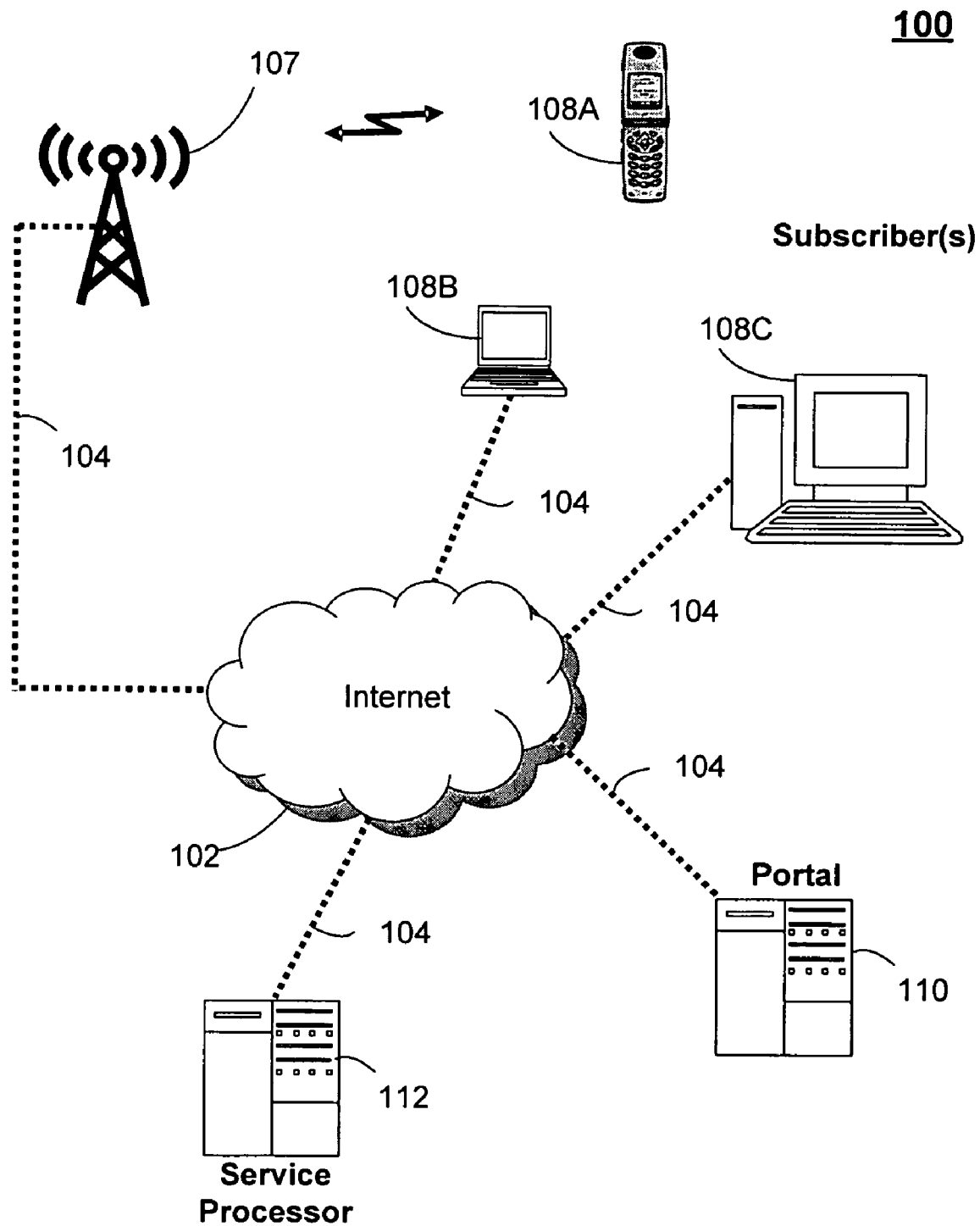
FIG. 1 is an illustration of a communication system in accordance with an embodiment of the present invention.

While the specification concludes with claims defining the features of embodiments of the invention that are regarded as novel, it is believed that these embodiments will be better understood from a consideration of the following description in conjunction with the figures, in which like reference numerals are carried forward.

Referring to FIG. 1, a communication system 100 having a portal 110, a service processor 112, and three embodiments of a subscriber 108A-C (represented by way of example as a wireless phone or wireless personal digital assistant, a portable computer laptop, and computer desktop, respectively) are shown. Each of the components 108-112 is able to intercommunicate by way of a communication network of the communication system 100. The communication system 100 of FIG. 1 further includes a conventional cellular network 107 coupled to a conventional Internet network 102.

The cellular network 107 provides a wireless means for communicating to the subscriber 108. Alternatively, the cellular network 107 can be replaced or supplemented by a conventional wireless local area network (such as Bluetooth, or IEEE 802.11) for short to mid-range communications. Any wireless communication network suitable to the invention as described herein can be used.

The communication system 100 components 107, 108A-C, 110 and 112 are coupled to the Internet 102 by way of conventional wire line or wireless means 104. Wire line means 104 can include but is not limited to a conventional phone line, Ethernet, cable, or optical system coupled to a central office or like switching means, which eventually interconnects to the Internet 102. Wireless means 104, on the other hand, can be represented by a wireless local area network, microwave relay tower, or like means. For the invention described henceforth, the means 104 used for communicating to the Internet 102 can comprise any conventional communication technology capable of interconnecting with the Internet 102. All such embodiments therefore are considered to be within the scope and spirit of the claims below.

Figure 2:
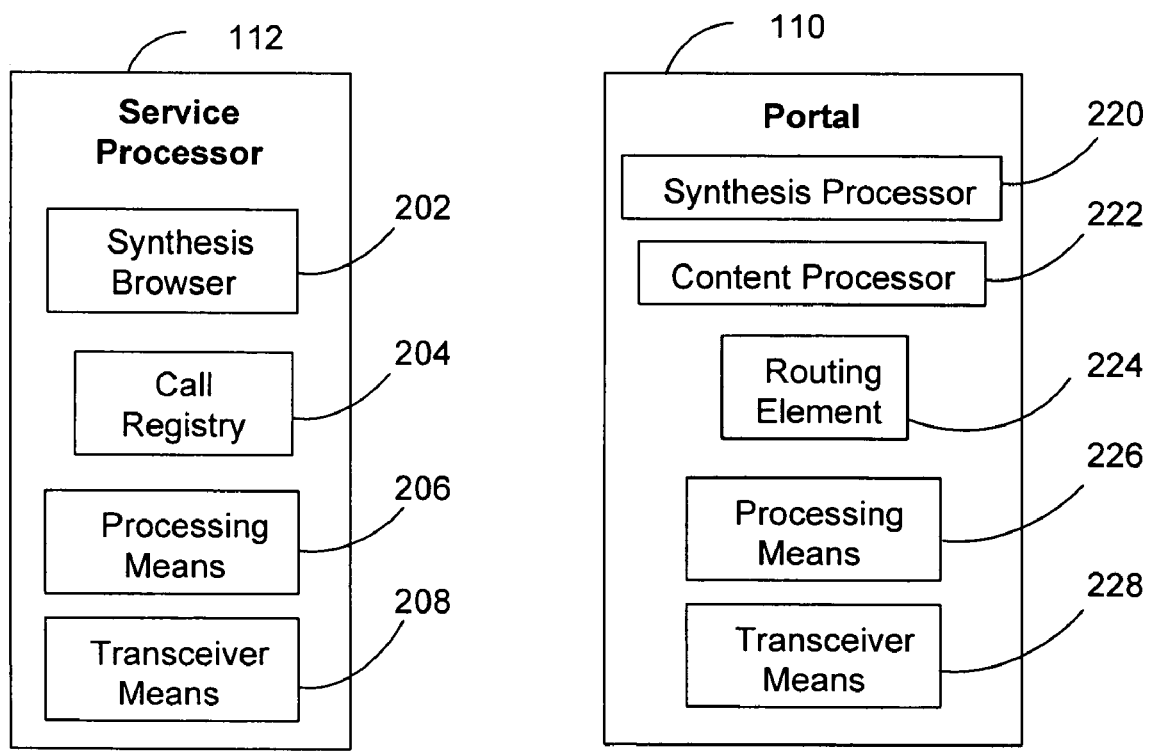
FIG. 2 shows detailed block diagrams of the components of the communication system of FIG. 1 in accordance with an embodiment of the present invention.

Referring to FIG. 2, detailed views of the components 108-112 of the communication system 100 are shown. The subscriber 108 comprises a communication application 210, a coupling application 212, a browser 214, a processing means 216 and a transceiver means 218. The communication application 210 is a software application for establishing synthesis communications with the service processor 112 as will be described below. The coupling application 212 is shown with hashed lines to represent a software application that is not normally inclusive of the subscriber 108. As will be described shortly, the coupling application 212 is supplied by the portal 110 for coupling the service processor 112 and the portal 110 during synthesis operations. The browser 214 is a conventional browser for controlling and experiencing content supplied by the portal 110. The experience can be visual, audible, tactile (to assist, for example, the impaired) or combinations thereof.

The processing means 216 includes conventional hardware and software such as, for example, a computer system having a processor, memory, display, audio system, input and output ports (e.g., a keypad, serial bus, tactile interface for the handicapped, etc.), and other conventional components regularly found in such devices to operate the subscriber 108 according to the invention described herein. In addition, the processing means 216 can be supplemented to perform conventional voice recognition functions as will be described below. The transceiver means 218 comprise conventional wireless or wire line transceiver hardware and software for communicating with the communication system 100.

The service processor 112 comprises a synthesis browser 202, a call registry 204, a processing means 206, and a transceiver means 208. The synthesis browser 202 provides a means for synthesizing supplementary content supplied by the portal 110 as will be described below. The call registry 204 provides a means for storing a ticket and a content type selected by the subscriber 108 corresponding to a synthesis method to be applied to the supplemental content. Depending on the needs of the service processor 112 the processing means 206 can comprise a conventional server for processing complex high-speed applications. In addition, the processing means 206 can perform conventional voice recognition functions as will be described below. The transceiver means 208 uses conventional wireless or wire line technology.

The portal 110 comprises a synthesis processor 220, a content processor 222, a routing element 224, a processing means 226 and a transceiver means 228. The synthesis processor 220 is used for generating supplementary content comprising pre-synthesized text-to-speech or speech-to-text content. The format for pre-synthesized text-to-speech content is based on conventional pre-synthesis formats such as voice mark-up language (VXML). Whereas the format for pre-synthesized speech-to-text content can be VXML translated back to a hypertext mark-up language (HTML). Depending on the original source of content generated by the content processor 222 (text or speech), the synthesis processor 220 can be called on by the routing element 224 to pre-synthesize content to a content type selected by the subscriber 108. The processing and transceiver means 226-228 can use similar if not identical technology as the service processor 112.

Figure 3:
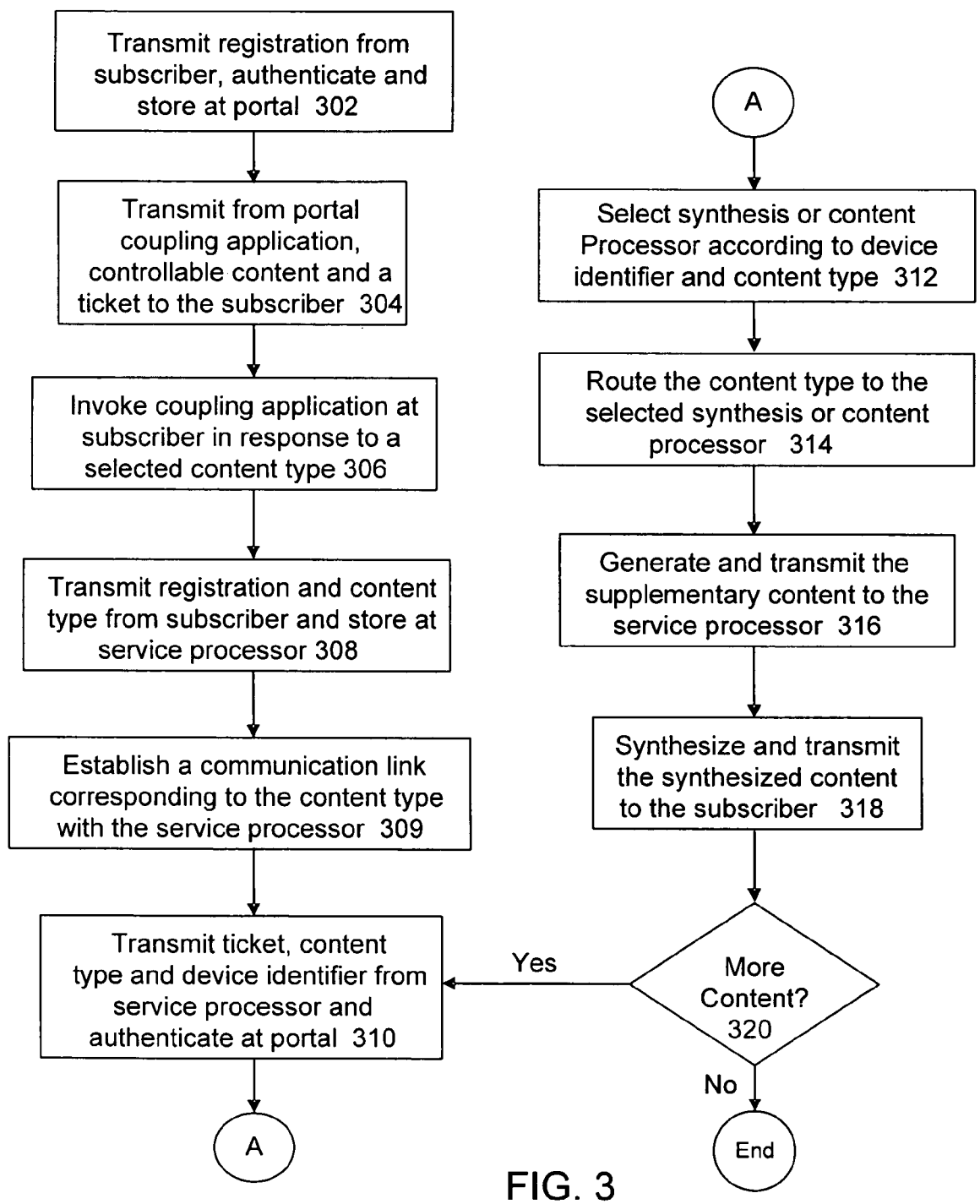
FIG. 3 is a flow chart illustrating a method for effortless association between services in the communication system in accordance with an embodiment of the present invention.

Referring to FIG. 3, a flow chart illustrating a method 300 for effortless association between services in the communication system 100. The method 300 begins with step 302 where the subscriber 108 transmits registration information to the portal 110. Step 302 follows a user registration process defined by the portal 110. Such a process begins with a registration prompt supplied to the subscriber 108 by the portal 110. The subscriber 108 populates the fields of the registration prompt with registration information such as, for example, a login and password. In an alternative embodiment, a more complex registration scheme can be used which employs greater security by way of variable passwords synchronized by conventional timers operating at the subscriber 108 and the portal 110.

Upon receiving the registration information, the portal 110 authenticates the subscriber 108 and stores the registration information for subsequent authentication cycles ensuing from further exchanges between the portal 110 and the subscriber 108. To authenticate the subscriber 108, the portal 110 compares the registration information with credentials of one or more subscribers 108 stored in the memory of the portal 110. If a match is found, authentication is completed and the registration request is accepted. If no match is found, then a registration rejection is submitted back to the subscriber 108.

Once the subscriber 108 has been authenticated as a valid subscriber of the portal 110, the portal 110 transmits to the subscriber 108 a coupling application 212, corresponding controllable content generated by the content processor 222, and a ticket, such as an HTML cookie, binding the subscriber 108 to a specific communication session with the portal 110. The controllable content can be an HTML document representing the aggregation of content from one or more content sources coupled to the portal 110 (herein referred to as portlets). The HTML document is processed by the browser 214 of the subscriber 108 and presented to a user of the subscriber 108 by way of a display and/or audio system of the processing means 216. The HTML document can be controlled by utilizing substantial structures such as a keypad of the processing means 216 with navigation capability. Alternatively, control of the HTML document can be supplemented by a voice recognition application capable of controlling portions thereof at the subscriber 108, or at the service processor 112 where the processing capabilities of the subscriber 108 are insufficient to support voice recognition.

Other conventional formats for controllable content can be used within the scope of the claims below. For illustration purposes only the initial format of the controllable content supplied by the content processor 222 is assumed to be HTML content. Alternatively, the format could have been initially VXML, which cane be interpreted by the browser 214 and presented at the subscriber 108 in audible form. In this embodiment, voice recognition at the subscriber 108 can be used to navigate through content provided by the portal 110.

The controllable content further comprises a content choice element associated with the content type and the coupling application 212. The content choice element is a controllable unit of the HTML document such as, for example, an HTML button. The button provides the user of the subscriber 108 an option to switch from a text (or visual) presentation of the HTML document (in whole or in part) to a speech equivalent of said presentation. An example of this utility is demonstrated by a user of the subscriber 108 choosing to listen to text messages (such as email) synthesized into speech. Alternatively, where the controllable content supplied by the portal 110 is VXML, the content choice element can provide an option to switch to a textual (visual) experience.

In an alternative embodiment, the controllable content can further comprise multiple content choice elements. For example, where the controllable content is HTML, a first content choice can be voice, a second content choice can be Braille (for the visually impaired), and a third content choice can be the combination of voice and Braille. It should be evident from the foregoing embodiments that innumerable combinations, additions and modifications can be applied to the controllable content and corresponding content choice elements included therein without changing the operability of the claimed invention.

Upon selecting a content choice element according to any one of the aforementioned embodiments, in step 306, a corresponding content type is created and the coupling application 212 is invoked in response to the selected content type at the subscriber 108. The content type includes navigation information and a content identifier. The content identifier is a descriptor of the content selected by a user of the subscriber 108 (e.g., voice, text, tactile or combinations thereof), while the navigation information identifies the content selected by the user of the subscriber 108. The navigation information can be, for example, a conventional URL (Universal Resource Locator) pointing to a portlet.

In step 308, the coupling application 212 transmits to the service processor 112 the ticket and content type. The ticket and content type are stored in the call registry 204 for later use, and a reference to the entry in the call registry 204 corresponding to the ticket and the content type is returned to the coupling application 212. The coupling application 212 in turn stores it in the memory of the processing means 216. The reference could be an explicit reference, or a reuse of an existing identifier, such as the IP address of the subscriber 108.

In step 309, the communication application 210 establishes a communication link 104 with the service processor 112 according to the content type. This is accomplished by the coupling application 212 invoking the communication application 210 and transferring to it the foregoing reference to the entry in the call registry 204. The communication application 210 in turn transmits the reference to the service processor 112 with a request that it establish a communication link corresponding to the content type. In the case where the content type is voice, the communication application 210 establishes a communication link 104 to support VOIP (Voice over Internet Protocol) with the call registry 204 reference provided in the calling number that establishes the voice session.

The content type is used by the service processor 112 to assess the synthesis type to be used (text-to-speech or speech-to-text). In step 310 the service processor 112 establishes communication with the portal 110 by transmitting the ticket from the call registry 204, the content type, and a device identifier. The portal 110 authenticates the service processor 112 and the subscriber 108 by way of the ticket, and thereby binds the sessions between the service processor 112 and the subscriber 108 so that communications are synchronized. Once the authentication has successfully taken place, the device identifier is used by the routing element 224 to select in step 312 one among the synthesis processor 220 and the content processor 222.

The routing element 224 supplies in step 314 the content type to the selected one of the processors 220-222. The content type is used by the select one of the processors 220-222 to generate in step 316 supplementary content corresponding to the content type. The supplementary content can be, for example, pre-synthesized text-to-speech content (e.g., VXML) where the subscriber 108 has chosen to switch from visual content to audible content. The supplementary content is then transmitted by the portal 110 to the service processor 112 for further processing.

In step 318, the synthesis browser 202 synthesizes the supplementary content into synthesized content representative of the content type selected by the subscriber 108. In the case where the content type is voice, the synthesis browser 202 generates conventional synthesized speech content, which is then transmitted to the subscriber 108 and processed by the browser 214, which in turn generates audible signals that are presented by the audio system of the processing means 216. All or a portion of the foregoing steps are repeated until step 320 determines that all content associated with the content type has been synthesized and transmitted to the subscriber 108, thereby ending the effortless association between services of the service processor 112 and the portal 110, respectively.

The invention described above overcomes the inability of the prior art to associate applications effortlessly without interrupting communications between the subscriber 108 and the portal 110. To the user of the subscriber 108, the complex communication steps to support the synthesis process described in method 300 are hidden. In addition, the switch between content types appears to a user to involve minimal effort (e.g., no more than a single button depression, or single voice command in a subscriber 108 using voice recognition technology), and where the portal 110, the service processor 112 and the communication network use state of the art processing and high-speed communications, respectively, the response time can be perceived to be nearly instantaneous.

In light of the foregoing description, it should be recognized that embodiments in the present invention could be realized in hardware, software, or a combination of hardware and software. These embodiments could also be realized in numerous configurations contemplated to be within the scope and spirit of the claims below. It should also be understood that the claims are intended to cover the structures described herein as performing the recited function and not only structural equivalents. The claims are sufficiently general to include equivalent structures.

For example, although a wire line communication means and a wireless communication means described above may not be structural equivalents in that a wire line employs a physical link (e.g., copper or optical cables) for communications, whereas a wireless communication system employs radio signals for communications, wire line and wireless communication means both provide a means for communicating between the subscriber 108 and the portal 110, and are therefore in the context of the invention, equivalent structures. Accordingly, all equivalent modifications of the description are intended to be included within the claimed scope as defined in the following claims.

What is claimed is:

1. A computer-implemented method of association between services in a communication system, the method comprising the steps of:

providing a communication system including a portal, a plurality of subscriber devices using different communication connections including a wired communication connections and a wireless communication connections, and a service processor, wherein the portal, the plurality of subscriber devices, and the service processor are communicatively linked through a communication network;

transmitting registration information from a subscriber device to the portal, the subscriber device having a browser for interpreting controllable content and a communication application;

authenticating the subscriber at the portal according to the registration information;

transmitting from the portal to the subscriber device a coupling application, corresponding controllable content, and a ticket identifying a communication session between the subscriber device and the portal, wherein the corresponding controllable content includes a content choice element associated with a content type and the coupling application;

invoking the coupling application in response to a content type of the corresponding controllable content selected at the subscriber device by selecting the content choice element;

transmitting the ticket and the selected content type from the coupling application to the service processor, the service processor including a synthesis browser;

transmitting the ticket, a device identifier, and the selected content type from the service processor to the portal;

authenticating the service processor at the portal according to the ticket and the device identifier;

transmitting supplementary content corresponding to the selected content type from the portal to the service processor, wherein the supplementary content is one among a group consisting of pre-synthesized text-to-speech content and pre-synthesized speech-to-text content;

synthesizing by the synthesis browser the supplementary content into synthesized content representative of the selected content type;

establishing by the communication application a communication link according to the selected content type between the subscriber device and the service processor; and transmitting the synthesized content from the service processor to the subscriber device via the established communication link.

2. The method of claim 1, wherein the authentication steps take place for each communication exchange between the subscriber, the service processor and the portal, respectively.

3. The method of claim 1, wherein establishing the communication link does not interrupt communications between the portal and the subscriber.

4. The method of claim 1, wherein the service processor further comprises a call registry, and the portal further comprises a synthesis processor, a content processor, and a routing element coupled thereto, the method further comprising the steps of:

storing the ticket and content type at the call registry;

determining at the routing element according to the device identifier and content type a select one of the synthesis and content processors;

routing the content type to the select one of the synthesis and content processors;

generating at the select one of the synthesis and content processors the supplementary content according to the content type;

transmitting from the selected one of the synthesis and content processors the supplementary content to the service processor;

synthesizing at the synthesis browser the supplementary content into synthesized content;

transmitting from the synthesis browser the synthesized content to the subscriber; and repeating all or a portion of the steps above until all content associated with the content type has been synthesized and transmitted to the subscriber.

5. The method of claim 4, further comprising the step of transmitting from the service processor to the coupling application a reference to the entry in the call registry corresponding to the ticket and content type.

6. A communication system, comprising:

a memory;

a portal;

a plurality of subscriber devices using different communication connections including a wired communication connection and a wireless communication connection, each subscriber device having a browser for interpreting controllable content and a communication application;

a service processor having a synthesis browser; and a communication network for providing communication between the portal, the subscriber devices and the service processor;

wherein the components of the communication system are programmed to:

transmit registration information from the subscriber device to the portal;

authenticate the subscriber at the portal according to the registration information;

transmit from the portal to the subscriber device a coupling application, corresponding controllable content, and a ticket identifying a communication session between the subscriber device and the portal, wherein the corresponding controllable content includes a content choice element associated with a content type and the coupling application;

invoke the coupling application in response to a content type of the controllable content selected at the subscriber device by selecting the content choice element;

transmit the ticket and the selected content type from the coupling application to the service processor;

transmit the ticket, a device identifier, and the selected content type from the service processor to the portal;

authenticate the service processor at the portal according to the ticket and the device identifier;

transmit supplementary content corresponding to the selected content type from the portal to the service processor, wherein the supplementary content is one among the group consisting of pre-synthesized text-to-speech content and pre-synthesized speech-to-text content;

synthesize by the synthesis browser the supplementary content into synthesized content representative of the selected content type;

establish by the communication application a communication link according to the selected content type between the subscriber device and the service processor; and transmit synthesized content corresponding to the supplementary content from the service processor to the subscriber device via the established communication link.

7. The communication system of claim 6, wherein the authentication steps take place for each communication exchange between the subscriber, the service processor and the portal, respectively.

8. The communication system of claim 6, wherein the service processor further comprises a call registry, and the portal further comprises a synthesis processor, a content processor, and a routing element coupled thereto, and wherein the components of the communication system are further programmed to:

store the ticket at the call registry;

determine at the routing element according to the device identifier and content type a select one of the synthesis and content processors;

route the content type to the select one of the synthesis and content processors;

generate at the select one of the synthesis and content processors the supplementary content according to the content type;

transmit from the selected one of the synthesis and content processors the supplementary content to the service processor;

synthesize at the synthesis browser the supplementary content into synthesized content;

transmit from the synthesis browser the synthesized content to the subscriber; and repeat all or a portion of the steps above until all content associated with the content type has been synthesized and transmitted to the subscriber.

9. The communication system of claim 6, wherein the components of the communication system are further programmed to transmit from the service processor to the coupling application a reference to the entry in the call registry corresponding to the ticket and content type.

\* \* \* \* \*